United States Patent [19]

Blytas et al.

[11] Patent Number: 4,960,865

[45] Date of Patent: Oct. 2, 1990

[54] WATER WASH OF OLEFIN/CARBON MONOXIDE POLYMER

[75] Inventors: George C. Blytas; Zaida Diaz, both of Houston, Tex.; William W. C. Hart, Avon, Conn.

[73] Assignee: Shell Oil Company, Houston, Tex.

[21] Appl. No.: 411,958

[22] Filed: Sep. 25, 1989

[51] Int. Cl.$^5$ .............................................. C08G 67/02
[52] U.S. Cl. ...................................... 528/499; 528/392
[58] Field of Search ................................. 528/499, 392

[56] References Cited

U.S. PATENT DOCUMENTS

| | | | |
|---|---|---|---|
| 2,495,286 | 1/1950 | Brubaker | 260/63 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,914,391 | 10/1975 | Nozaki | 423/364 |
| 4,798,884 | 1/1989 | Brons et al. | 528/491 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |
| 1081304 | 8/1967 | United Kingdom . |

OTHER PUBLICATIONS

Kirk–Othmer Encyclopedia of Chemical Technology, 2nd Ed., vol. 12, 1967, 132–3.

*Primary Examiner*—Harold D. Anderson
*Attorney, Agent, or Firm*—Dean F. Vance

[57] ABSTRACT

The present invention relates to an improved process for working up a linear alternating polymer of carbon monoxide and at least one ethylenically unsaturated hydrocarbon by washing the polymer with hot water.

7 Claims, No Drawings

WATER WASH OF OLEFIN/CARBON MONOXIDE POLYMER

FIELD OF THE INVENTION

This invention relates to an improved process for the production of linear alternating polymers of carbon monoxide and at least one ethylenically unsaturated hydrocarbon. More particularly, the invention relates to a process for working up such polymers wherein such polymers are contacted with hot water and the resulting polymer is recovered.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. Nos. 3,914,391, 3,835,123 and 3,694,412.

More recently, the class of linear alternating polymers of carbon monoxide and at least one ethylenically unsaturated hydrocarbon has become of greater interest in part because of the greater availability of the polymers. The more recent processes for the production of these polymers, now becoming known as polyketones or polyketone polymers, are illustrated by a number of published European Patent Applications including 121,965, 181,014, 213,671 and 257,663. The process, now considered to be broadly conventional, generally involves the use of a catalyst composition formed from a compound of a Group VIII metal selected from palladium, cobalt or nickel, the anion of a non-hydrohalogenic acid having a pKa below about 6 and preferably below 2, and a bidentate ligand of phosphorus, arsenic or antimony. The resulting polyketone polymers are relatively high molecular weight thermoplastics having established utility in the production of shaped articles by the methods which are conventional for thermoplastic polymers.

The process of producing the polyketone polymers typically involves contacting the carbon monoxide and ethylene hydrocarbon(s) under polymerization conditions in the presence of the catalyst composition and a reaction diluent in which the catalyst composition is soluble but in which the polyketone polymer product is relatively insoluble. Then the polymer is partially cleaned up in additional process steps, such as those described in U.S. Pat. No. 4,798,884, having a common assignee. The working-up process claimed in the patent No. '884 is a process for working up a linear alternating copolymer of carbon monoxide and ethylene which process comprises washing the copolymer with an organic solvent selected from the group consisting of aliphatic alcohols, ketones, ethers, nitriles and saturated hydrocarbons, separating the copolymer from the solvent and drying the copolymer at a temperature of at least (T-30)° C., wherein T is the boiling point of the solvent at room pressure, in the absence of molecular oxygen and in the absence of water.

A new process variation has been discovered which results in the preparation of polymers having improved stability.

SUMMARY OF THE INVENTION

The present invention provides an improved process for the production of linear alternating polymer of carbon monoxide and at least one ethylenically unsaturated hydrocarbon. More particularly, the invention provides an improved process for working up a linear alternating polymer of carbon monoxide and at least one ethylenically unsaturated hydrocarbon, which process comprises (a) washing the polymer from the reactor with water at a temperature of between about 80° C. and about 180° C. in a liquid water to solid polymer weight ratio of between about 0.5 and about 10, (b) separating the polymer from the water, and (c) drying the polymer.

The above process is particularly useful for polymers having above 0.1% weight palladium from the reactor.

DESCRIPTION OF THE INVENTION

The polyketone polymers produced by the improved process of the invention are linear alternating polymers of carbon monoxide and at least one ethylenically unsaturated hydrocarbon. The ethylenically unsaturated hydrocarbons useful as precursors of the polyketone polymers have up to 10 carbons inclusive and are aliphatic including ethylene and other $\alpha$-olefins including propylene, 1-butene, isobutylene, 1-hexene and 1-decene, or are arylaliphatic containing an aryl substituent on an otherwise aliphatic molecule, particularly an aryl substituent on a carbon atom of the ethylene unsaturation. Illustrative of this latter class of ethylenically unsaturated hydrocarbons are styrene, p-methylstyrene, p-ethylstyrene and m-methylstyrene. The preferred polyketone polymers are copolymers of carbon monoxide and ethylene or terpolymers of carbon monoxide, ethylene and a second hydrocarbon of at least 3 carbon atoms, particularly an $\alpha$-olefin such as propylene.

When the preferred terpolymers are produced there will be at least about 2 units incorporating a moiety of ethylene for each unit incorporating a moiety of the second hydrocarbon. Preferably, there will be from about 10 to about 100 units incorporating a moiety of ethylene per unit incorporating a moiety of the second hydrocarbon. The polymer chain of the preferred polymers is therefore represented by the formula

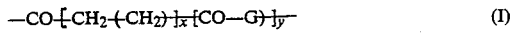

$$-CO + CH_2 + CH_2 \xrightarrow{}_x + CO - G \xrightarrow{}_y - \qquad (I)$$

wherein G is the moiety of a second hydrocarbon polymerized through the ethylenic unsaturation. The $-CO-CH_2-CH_2-$ units and the $-CO-G-$ units are found randomly throughout the polymer chain and the ratio of y:x is no more than about 0.5. In the modification of the improved process of the invention which produces copolymers without the presence of a second hydrocarbon, the polymers are represented by the above formula (1) wherein y is 0. When y is other than 0, i.e., terpolymers are produced, the preferred ratio of y:x is from about 0.01 to about 0.1. The end groups or "caps" of the polymer chain will depend upon what materials are present during the polymerization and whether and how the polymers are purified. The precise nature of the end groups is of little significance so far as the overall properties of the polymer are concerned so that the polymer is fairly represented by the above formula for the polymer chain.

The process of the invention is applied to the production of linear alternating polymers having a limiting viscosity number (LVN), when measured in m-cresol at 60° C., of from 0.5 dl/g to 10, more preferably from about 0.8 to about 4 LVN and most preferably from about 1.0 to about 7.5. Typical melting points of the polyketone polymers are from about 175° C. to about 300° C., more frequently from about 210° C. to about 260° C.

The scope of the process for polyketone production is extensive as illustrated by the above published European Patent Applications. Preferably I5 the catalyst to be used comprises a palladium salt, an anion of certain strong non-hydrohalogenic acids and a bidentate phosphorus ligand of somewhat specific structure. Suitable palladium salts include palladium alkanoates, and alkanoates such as palladium acetate, palladium propionate, palladium hexanoate and palladium octanoate are satisfactory. Palladium acetate is preferred. The anion is the anion of a non-hydrohalogenic acid having a pKa below 6 which is an inorganic acid such as sulfuric acid or perchloric acid or an organic acid including carboxylic acids such as trichloroacetic acid, difluoroacetic acid and trifluoroacetic acid, and sulfonic acids such as methanesulfonic acid and p-toluenesulfonic acid. The anion of trifluoroacetic acid is particularly preferred. The anion is customarily and preferably provided in the form of the free acid although in another modification of the process the anion is provided as a non-noble transition metal salt, particularly as a copper salt. The bidentate phosphorus ligand is a ligand of the formula

wherein R independently is an aromatic group substituted on at least one ring carbon ortho to the ring carbon through which the group is bound to the phosphorus with a lower alkoxy substituent. Preferred R groups are alkoxyphenyl groups such as 2-methoxyphenyl, 2,4-diethoxyphenyl and 2,4,6-trimethoxyphenyl. The R' group is a divalent bridging group having from 2 to 4 carbon atoms in the bridge. Preferred R groups are polymethylene groups, i.e., groups of the formula $-(CH_2)_n-$ wherein n is an integer from 2 to 4 inclusive. Particularly preferred is the trimethylene or 1,3-propylene group. Best results are obtained in the process of the invention when the bidentate phosphorus ligand is 1,3-bis[di(2-methoxyphenyl)phosphino]propane.

Another catalyst system useful in the present invention is the catalyst system and process of Nozaki, as taught in U.S. Pat. No. 3,914,391, which is incorporated by reference herein. In Nozaki No. '391, the process for making the HPd(CN)₃ catalyst comprises
 (1) contacting Pd(CN)₂ with an aqueous solution of HCN in stoichiometric excess at a temperature from about 0° C. to 100° C.
 (2) evaporating the resulting reaction mixture to dryness under reduced pressure at a temperature of from about 0° C. to 40° C., and
 (3) recovering the resulting white, water-soluble residue.

The process for using the catalyst to make polyketones is described in U.S. Pat. No. 3,835,123, which is also incorporated by reference.

Still another catalyst system useful in the present invention is an alternative catalyst system and process of Nozaki, as taught in U.S. Pat. No. 3,694,412, which is incorporated by reference herein. In Nozaki No. '412, the process comprises preparing high molecular weight interpolymers of carbon monoxide and an alpha-olefin having from 2 to 8 carbon atoms in improved yield by reacting said alpha-olefin and carbon monoxide in a nitrogen-containing hydrocarbon solvent at 75 to 125° C., and 25 to 150 atmosphere pressure in the presence of a catalytic amount of an aryl-phosphine complex of the general formula

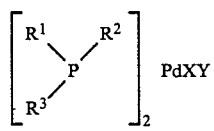

wherein $R^1$ is an aryl radical, $R^2$ and $R^3$ are alkyl or aryl radicals selected from the group consisting of phenyl, m-tolyl and p-tolyl, X is a halogen atom and Y is a halogen atom or a hydrocarbon radical, said mole ratio of alpha-olefin to carbon monoxide being from about 3:1 to 10:1. Preferred catalysts include (triphenyl phosphine)₂PdCl₂, prepared by reacting PdCl₂ with triphenyl phosphine.

Sufficient catalyst composition is employed to provide from about $1 \times 10^{-7}$ mol to about $1 \times 10^{-3}$ mol of palladium per mol of olefin to be polymerized. Amounts of catalyst sufficient to provide from about $1 \times 10^{-6}$ mol to about $1 \times 10^{-4}$ mol of palladium per mol of olefin to be polymerized are preferred. The anion is provided in a quantity of from about 0.5 mol to about 50 mols per mol of palladium with anion quantities of from about 1 mol to about 25 mols per mol of palladium being preferred. The bidentate phosphorus ligand (if used) is typically provided in a quantity of from about 0.5 mol to about 2 mols per mol of palladium but more often is provided in a quantity of from about 0.75 mol to about 1.5 mol per mol of palladium.

When using the bidentate phosphorous ligand catalyst, it is useful on occasion to provide to the catalyst composition mixture of the bidentate ligand version an organic oxidizing agent as a fourth component in order to enhance the activity of the catalyst. Organic oxidants useful for this purpose include aliphatic nitrite compounds such as butyl nitrite and hexyl nitrite, aromatic nitro compounds such as nitrobenzene and 2,4-dinitrotoluene, and both 1,2- and 1,4-quinones. The quinones constitute a preferred class of organic oxidizing agents and benzoquinones, naphthoquinones and anthraquinones are satisfactory. The 1,4-quinones are particularly preferred, especially 1,4-benzoquinone. No oxidizing agent is required in the catalyst composition mixtures but if employed the oxidizing agent is present in a quantity of up to 5000 mol per mol of palladium. When present the organic oxidant is preferably present in a quantity from about 10 mols to about 1000 mols per mol of palladium.

The polymerization according to the invention is conducted by contacting the carbon monoxide, ethylene and optionally propylene in the case wherein terpolymers are desired, under polymerization conditions, in the presence of the catalyst composition and the reaction diluent. The relative amounts of carbon monoxide and olefin to be polymerized should be such to provide an olefin/carbon monoxide partial pressure ratio from about 0.5 to about 5. Preferably, the olefin/- carbon monoxide partial pressure ratio will be from about 0.6 to about 3.5. Typical polymerization conditions include a polymerization temperature of from about 40©C. to about 120° C. with polymerization temperatures from about 50° C. to about 100° C. being preferred. The overall reaction pressure is suitably from about 20 bar to about 150 bar but reaction pressures from about 30 bar to about 100 bar are preferred. Suitable reaction diluents include the lower alkanols such as methanol and ethanol. Methanol is particularly preferred as the reaction diluent.

The contacting of the reactants, catalyst composition and reaction diluent takes place in a suitable reactor wherein reactant/catalyst contact is maintained by conventional methods such as shaking or stirring. The polymer product is obtained as a substantially insoluble material in the reaction diluent and is recovered by well known procedures such as filtration or decantation.

The present invention differs from the working up process of U.S. Pat. No. 4,798,884, in that the polymer is washed with hot water instead of an organic solvent. The advantage of using hot water is that high temperature promotes the rates of diffusion of impurities from the polymer phase to the water phase. Furthermore, the solubilities of most organic impurities in water increase with temperature. Finally, water is non-toxic and its solubility in the polymer phase is negligible. Preferably, the water has been treated first to remove undesired minerals (i.e., the water is demineralized). Preferably, any sodium present in the water is essentially removed prior to use as a washing medium in the present invention.

The polymer is washed with the water under conditions effective to reduce at least some of the impurities in the copolymer. The conditions effective to reduce the amount of impurities and improve stability include a wash temperature of between about 80° C. and about 180° C., preferably between about 100° C. and about 130° C. Contact times may vary from about 5 minutes to two hours or even longer. The weight ratio of liquid water to solid polymer should be about 0.5 to about 10, preferably about 1 to about 2.

Multiple washing steps may be employed, as would be in a batch contacting mode. Preferably, the contact between hot water and polymer should be carried out in a manner which allows maximum utilization of the water wash. For example recycling of the same water over a partially washed polymer sample, or countercurrent contacting of the two phases can be used.

The washed polymer is recovered by conventional methods, and any residual water is essentially removed in a drying step, e.g. by use of a vented extruder.

The polyketone polymer product of the process of the invention is a thermoplastic material of established utility and is processed by procedures which are conventional for thermoplastics such as injection molding, extrusion and thermoforming. The polymer is processed into sheets, films, wire and cable, fibers and shaped articles. Illustrative of specific application is the processing of the polymer into shaped articles useful as containers for food and drink.

The invention is further illustrated by the following Comparative Examples (not of the invention) and the Illustrative Embodiments which should not be construed as limiting the invention. The polymer products which were copolymers were determined by $^{13}$C-NMR analysis to be of the repeating formula —CO—$C_2H_4$—.

Illustrative Embodiment I

A linear alternating polymer of carbon monoxide and ethylene was prepared with a catalyst consisting essentially of HPd(CN)$_3$ as described in the examples of U.S. Pat. No. 3,835,123. The resulting polymer had a palladium content of 0.23% weight, and a gray appearance.

Originally, the use of hot water to work the polyketone was designed to remove palladium from polyketone to a level of 10 ppm or less. This limit was imposed because of the economic incentive to recover the expensive catalyst. In addition, there was the concern that catalyst residues may promote undesirable crosslinking reactions at the polymer processing temperatures. Since the polymer yield with the HPd(CN)$_3$ catalyst was typically about $10^3$g/g Pd, removal of Pd to 10 ppm would require an extraction efficiency of 99% or greater.

The extractants tested included hot water, acetone, and organic chelators such as oxine and acetylacetone (acac). A glacial acetic acid pretreatment step was used in some cases in an attempt to facilitate palladium removal by breaking any palladium - carbon bonds, if present. Complete removal of the acetic acid before the next treatment step was achieved by washing the polymer with boiling water several times until the pH of the water wash was neutral. The results of these tests are summarized in Table 1.

It was found that the extractants tested were relatively inefficient for palladium recovery. However, it was also found that treatment with acac or hot water improved the thermal stability of the polymer. Since palladium was not extracted in these experiments, this finding suggested that the acac and hot water treatments inhibit or remove a deleterious agent present in the polymer. It was observed that the pH of the water used to extract the polymer decreased as a result of the extraction. It was found by potentiometric titration that this was due to the presence of a strong acid whose pH was about 2, which suggested it might be HPd(CN)$_3$. This was later confirmed by acid exclusion chromatography and UV spectroscopy using HPd(CN)$_3$ standards prepared from Pd(CN)$_2$ and HCN. The stabilization caused by the acac treatment was probably due to neutralization of this same acid function by a Lewis acid-base interaction.

The improved thermal stability of the treated polymer enabled the inventors to test the processability and the properties of appropriately formulated polyketone samples. For instance, polyketone samples which had been treated with boiling water could be compounded with 5% $\gamma$-Al$_2$O$_3$ (an inert metal scavenger according to patent literature) and 7% Tyril (a typical flow modifier). These samples showed excellent thermal stability, and when processed in the conventional manner showed properties similar to those of engineering thermoplastics.

TABLE 1

PALLADIUM REMOVAL FROM POLYKETONE

| Extraction Conditions | | | Contact | Results | |
|---|---|---|---|---|---|
| Extractant | L/S (w/w)[a] | T(°C.) | Time (hr) | % w Pd in Polymer[b] | Polymer Color |
| 1. None | — | — | — | .23 | gray |
| 2. Water | 3 | 158 | 2 | .23 | gray |
| 3. Acetone | 3 | 80 | 2 | .24 | gray |
| 4. 0.1 M acac in $C_6H_6$ | 2.6 | 80 | 2 | .23 | gray |
| 5. 0.1 M oxine in $CHCl_3$ | 4.5 | 80 | 2 | .22 | gray |
| 6. 0.5% w HAc[c] in m-cresol | 3 | 80 | 2 | swollen gray polymer- difficult solid/liquid separation | |
| 7. 0.2 M acac in Toluene | 2.6 | 80 | 4 | .24 | gray |
| 8. (a) glacial HAc | 3.2 | 50 | 2 | .24 | gray |
| (b) 0.2 M acac in toluene | 4.4 | 80 | 2 | .24 | gray |
| 9. Same as 8 | " | " | " | .23 | " |

[a] liquid to solid weight ratio
[b] by Neutron Activation Analysis
[c] HAc = acetic acid

What is claimed is:

1. A process for working up a linear alternating polymer of carbon monoxide and at least one ethylenically unsaturated hydrocarbon, which process comprises a) washing the polymer with water at a temperature of between about 80° C. and about 180° C. in a liquid water to solid polymer weight ratio of between about 0.5 and about 10, b) separating the polymer from the water, and c) drying the polymer.

2. The process of claim 1 wherein the linear alternating polymer is represented by the repeating formula $$-CO-[CH_2-(CH_2)_x-(CO-G)]_y-$$

wherein G is a moiety of propylene polymerized through the ethylenic unsaturation and the ratio of y:x is no more than about 0.5.

3. The process of claim 2 wherein y is 0.

4. The process of claim 2 wherein the ratio of y:x is from about 0.01 to about 0.1.

5. The process of claim 1 wherein said polymer is prepared by contacting the carbon monoxide and ethylenically unsaturated hydrocarbon in a ratio such that the olefin/carbon monoxide partial pressure ratio is from about 0.5 to about 5, under polymerization conditions in the presence of a reaction diluent in which the linear alternating polymer is substantially insoluble and a catalyst composition formed from a palladium salt, an anion of a non-hydrohalogenic acid having a pKa below 6 and a bidentate phosphorus ligand of the formula

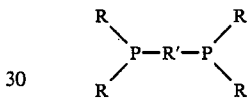

wherein R' is a divalent bridging group having from 2 to 4 carbon atoms in the bridge and R independently is aromatic substituted on at least one ring carbon ortho to the ring carbon atom connected to the phosphorus with a lower alkoxy substituent.

6. The process of claim 1 wherein said polymer is prepared by contacting the carbon monoxide and ethylenically unsaturated hydrocarbon in a ratio such that the olefin/carbon monoxide partial pressure is from about 0.5 to about 5, under polymerization conditions in the presence of a reaction diluent in which the linear alternating polymer is substantially insoluble and a catalyst composition consisting essentially of $HPd(CN)_3$.

7. The process of claim 6 wherein said polymer prior to contacting with water has a palladium content of greater than 0.1% weight.

* * * * *